(12) United States Patent
Ogg et al.

(10) Patent No.: US 9,286,444 B2
(45) Date of Patent: Mar. 15, 2016

(54) NEXT GENERATION SECURE GATEWAY

(75) Inventors: Ricky L. Ogg, Plain City, OH (US); Joseph E. Hirschinger, Hilliard, OH (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 779 days.

(21) Appl. No.: 13/406,612

(22) Filed: Feb. 28, 2012

(65) Prior Publication Data

US 2013/0227672 A1   Aug. 29, 2013

(51) Int. Cl.
*G06F 15/16* (2006.01)
*G06F 21/00* (2013.01)
*H04L 29/06* (2006.01)

(52) U.S. Cl.
CPC ............ *G06F 21/00* (2013.01); *H04L 63/0218* (2013.01); *H04L 63/0272* (2013.01); *H04L 63/1416* (2013.01); *H04L 63/164* (2013.01)

(58) Field of Classification Search
CPC . G06F 21/00; H04L 63/0272; H04L 63/0218; H04L 63/1416; H04L 63/164
USPC .............. 726/12, 15, 1, 11, 13; 709/232, 224, 709/226; 370/408, 392, 395, 401
See application file for complete search history.

(56) References Cited

U.S. PATENT DOCUMENTS

| | | | |
|---|---|---|---|
| 8,429,276 B1* | 4/2013 | Kumar et al. ................. | 709/226 |
| 8,464,335 B1* | 6/2013 | Sinha et al. .................... | 726/13 |
| 2002/0129271 A1* | 9/2002 | Stanaway et al. ............. | 713/201 |
| 2005/0091396 A1* | 4/2005 | Nilakantan et al. ........... | 709/232 |
| 2008/0123661 A1* | 5/2008 | Steets et al. ............... | 370/395.21 |
| 2008/0144625 A1* | 6/2008 | Wu et al. ....................... | 370/392 |
| 2009/0199290 A1* | 8/2009 | McCullough et al. .......... | 726/12 |
| 2011/0261828 A1* | 10/2011 | Smith .......................... | 370/401 |
| 2011/0292946 A1* | 12/2011 | Flinta et al. ............... | 370/395.53 |
| 2012/0278479 A1* | 11/2012 | Miller et al. ................... | 709/224 |
| 2012/0311659 A1* | 12/2012 | Narain et al. ..................... | 726/1 |

* cited by examiner

Primary Examiner — Thuong Nguyen

(57) ABSTRACT

A system includes a cloud-computing infrastructure to provide multitenant access from a public Internet Protocol (IP) network and multiple instances of a virtualized secure gateway operating on one or more physical devices within the cloud-computing infrastructure. The multiple instances of the virtualized secure gateway provide a point of entry to a private IP network. Each instance of the multiple instances of the virtualized secure gateway is configured to terminate multiple virtual private network (VPN) tunnels from a single customer accessing the private IP network via the public IP network, and each instance of the multiple instances of the virtualized secure gateway resides on a different processing core of the physical devices within the cloud-computing infrastructure.

18 Claims, 7 Drawing Sheets

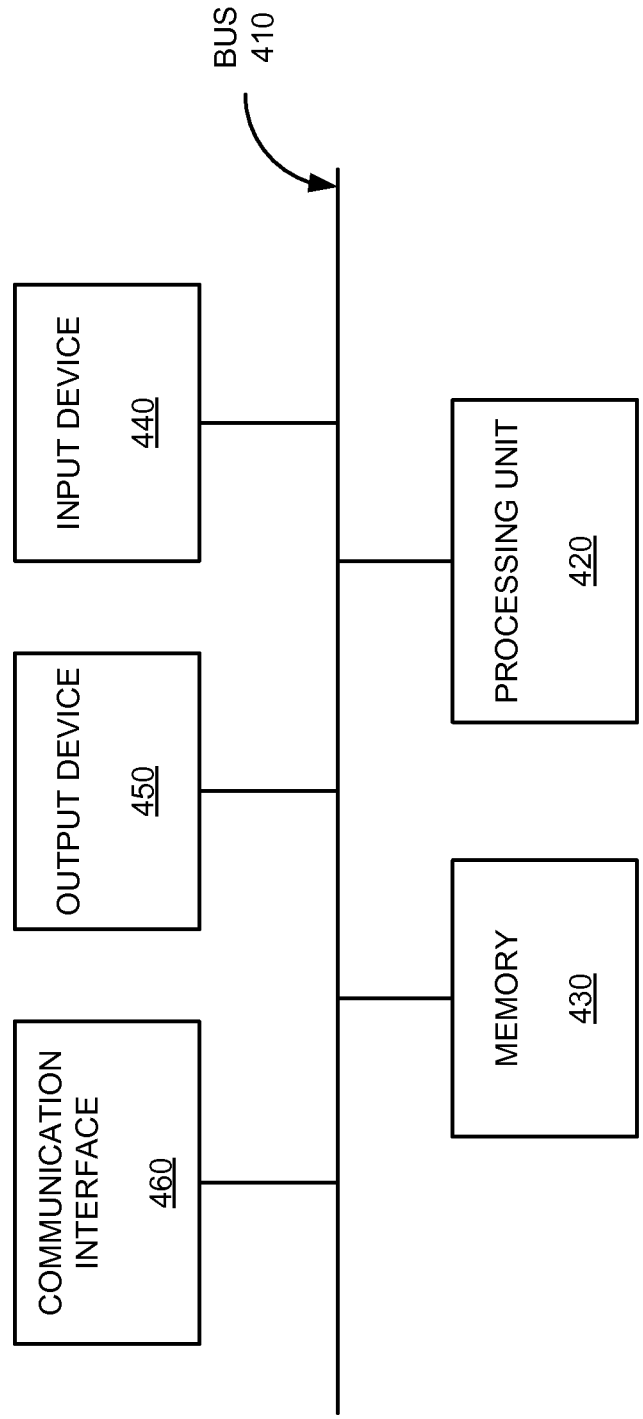

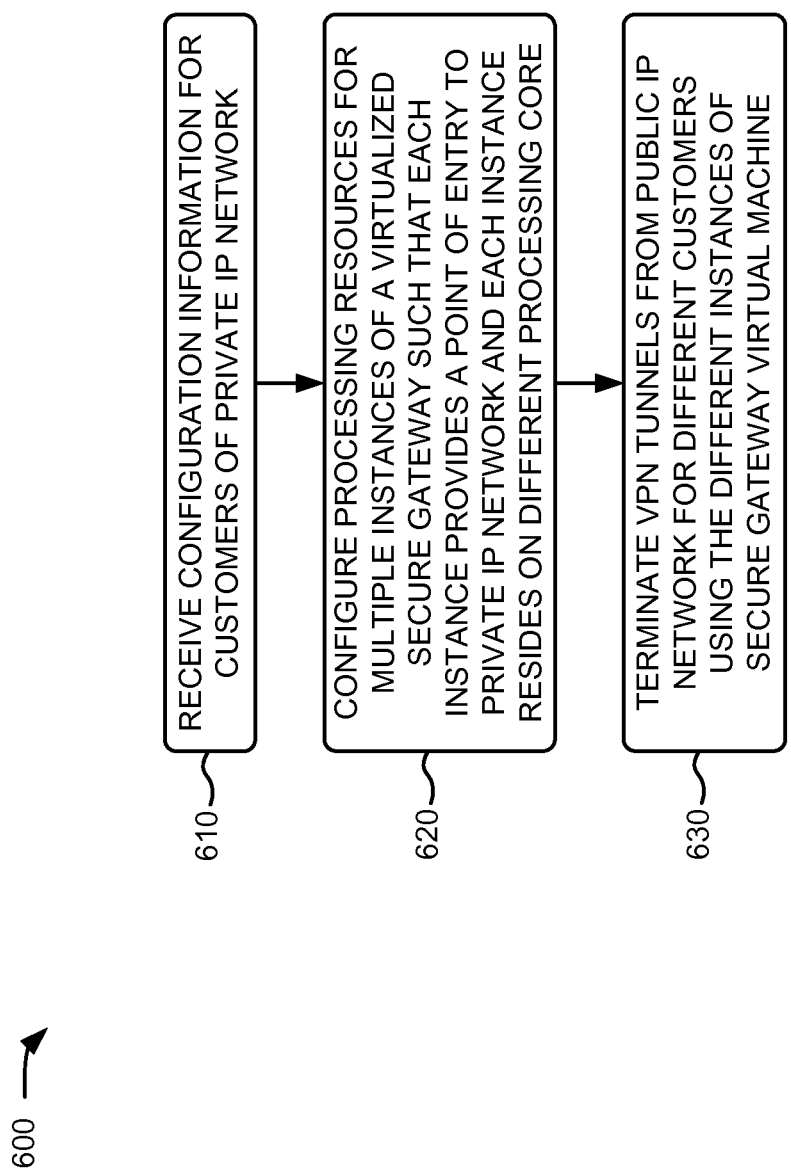

NEXT GENERATION SECURE GATEWAY

BACKGROUND

A gateway is a network point that acts as an entrance to another network. Secure communications between different networks may be conducted using a virtual private network (VPN). A typical VPN is a network of point-to-point tunnels, where each tunnel is a security association (SA) between two security devices. A security key for the SA is negotiated between two tunnel end devices.

Secure gateway architecture to support VPNs typically involves dedicated physical devices for enterprise clients. Scaling this dedicated secure gateway architecture for a multitenant environment that is suitable for service providers is both costly and subject to time-to-market delays.

BRIEF DESCRIPTION OF THE DRAWINGS

FIG. 4 is a diagram of exemplary components of a device that may be used within the network of FIG. 1;

FIG. 6 is a flowchart of an exemplary process for providing a virtualized secure gateway, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may use virtualized secure gateways to support virtual private network (VPN) tunneling and eliminate unique dedicated secure gateway physical devices. In one implementation, one or more devices of a cloud-computing infrastructure provide multi-tenant access from a public Internet Protocol (IP) network and multiple instances of a virtualized secure gateway operating on one or more physical devices within the cloud-computing infrastructure. The multiple instances of the virtualized secure gateway may provide a point of entry to a private IP network. Each instance of the multiple instances of the virtualized secure gateway may be configured to terminate multiple VPN tunnels from a single customer accessing the private IP network via the public IP network. Each instance of the multiple instances of the virtualized secure gateway may reside on a different processing core of the physical devices within the cloud-computing infrastructure.

Figure 1:
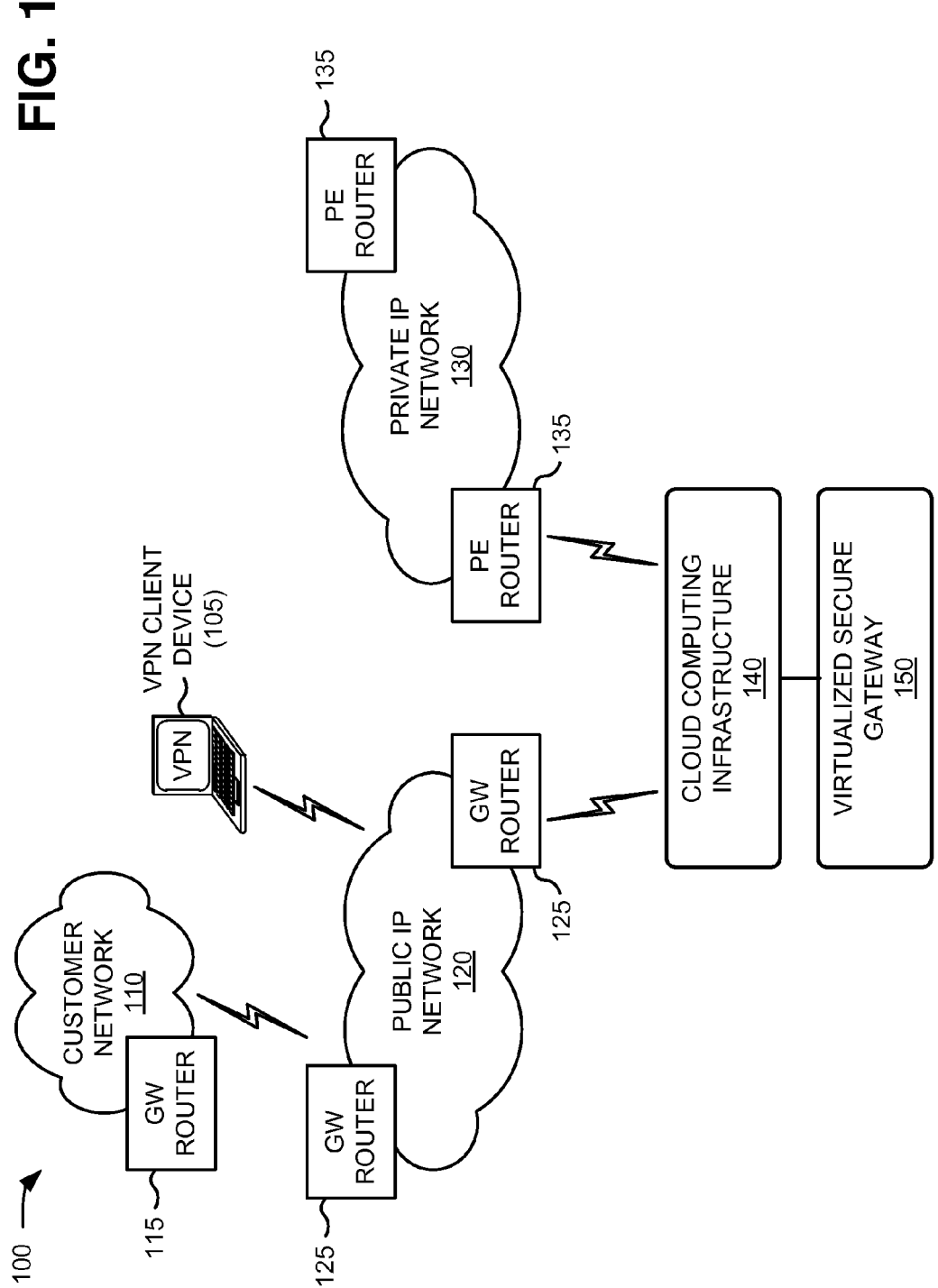
FIG. 1 is a diagram that illustrates an exemplary network in which systems and/or methods, described herein, may be implemented.

FIG. 1 is a diagram that illustrates an exemplary network 100 in which systems and/or methods described herein may be implemented. As shown in FIG. 1, network 100 may include VPN client device 105, a customer local area network (LAN) 110 including one or more gateway (GW) routers 115, a public IP network 120 including one or more gateway (GW) routers 125, a private IP network 130 including multiple provider edge (PE) routers 135, a cloud computing infrastructure 140, and a virtualized secure gateway 150. Components of network 100 may be connected via wired or wireless links.

VPN client device 105 may include any type of device that is capable of transmitting and receiving signals to/from a network. For example, VPN client device 105 may include any client device, such as a personal computer (PC), a laptop computer, a smart phone, a web-based appliance, etc., that is configured with software to establish a VPN tunnel with another endpoint. In one implementation, VPN client device 105 may include software to initiate an Internet Protocol Security (IPsec) tunnel between VPN client device 105 and, for example, virtualized secure gateway 150. In another implementation, VPN client device 105 may include software to initiate a Secure Socket Layer (SSL) session with virtualized secure gateway 150.

Customer network 110 may include a local area network (LAN), a wide area network (WAN), or a combination of networks that provide network access to customer devices or end users. In one implementation, customer network 110 may include a network interconnecting one or more user devices (not shown), such as devices providing data services (e.g., personal computers, workstations, laptops, etc.), devices providing voice services (e.g., telephones), and/or devices providing video services (e.g., televisions, set-top boxes, etc.).

In one implementation, customer network 110 may include one or more gateway (GW) routers 115 (e.g., customer premises equipment) that provide a hardware client to act as a secure gateway for devices within customer network 110. For example, gateway router 115 may include any network device, such as a router, switch, bridge, etc., that is configured to with hardware and/or software to establish an Internet Protocol Security (IPsec) tunnel between gateway router 115 and another endpoint, such as, for example, virtualized secure gateway 150.

Public IP network 120 may include a wide area network, an intranet, or a combination of networks that support IP communications. Public IP network 120 may include, for example, an untrusted network, such as the Internet. Public IP network 120 may further include one or more gateway routers 125 and other transport and/or network devices such as routers, switches, and/or firewalls.

Gateway router 125 may include one or more data transfer devices, such as a gateway, a router, a switch, a firewall, a network interface card (NIC), a hub, a bridge, a proxy server, or some other type of device that processes and/or transfers data. Gateway router 125 may control and/or support two-way communications with devices in other networks. For example, gateway router 125 may support communications with customer network 110 and/or cloud computing infrastructure 140.

Private IP network 130 may include devices and/or systems for providing services, such as a service for data transfers, voicemail, call blocking, calling card, audio, and/or network conferencing, etc. In some implementations, private IP network 130 may provide redundancy and/or the ability to distribute network loads. For example, private IP network 225 may include an IP network or a multiprotocol label switching (MPLS) network implementing an Interior Gateway Protocol (IGP) or another protocol that implements a minimum cost end-to-end path for routing between nodes. Private IP network 130 may provide one or more interfaces to connect to client devices (e.g., VPN client device 105 or devices residing on a local customer network 110).

Provider edge router 135 may include one or more data transfer devices, such as a gateway, a router, a switch, a firewall, a network interface card (NIC), a hub, a bridge, a proxy server, or some other type of device that processes and/or transfers data. For example, provider edge router 135 may include routers that provide an entry and/or an exit to and from private IP network 130.

Cloud computing infrastructure 140 may include network devices, computing devices, and/or storage devices to provide shared resources to users of public IP network 120 and/or private IP network 130. Cloud computing infrastructure 140 is described further in connection with FIG. 2.

Virtualized secure gateway 150 may include hardware or a combination of hardware and software to provide an interface between different networks. In one implementation, virtualized secure gateway 150 may include a hyper-text transfer protocol (HTTP) gateway or a SSL gateway to act as intermediary between public IP network 120 and private IP network 130. In implementations described herein, virtualized secure gateway 150 may provide secure gateway functionality without unique dedicated infrastructure build-outs. Virtualized secure gateway 150 is described further in connection with FIG. 3.

The exemplary configuration illustrated in FIG. 1 is provided for simplicity. It should be understood that a typical network may include more or fewer devices than illustrated in FIG. 1. For example, in a multitenant environment, network 100 may include thousands of VPN client devices 105 and/or customer networks 110 associated with different customers. In addition, network 100 may include additional elements, such as switches, gateways, routers, etc., that aid in routing data. Also, various functions are described below as being performed by particular components in network 100. In other implementations, various functions described as being performed by one device may be performed by another device or multiple other devices, and/or various functions described as being performed by multiple devices may be combined and performed by a single device.

Figure 2:
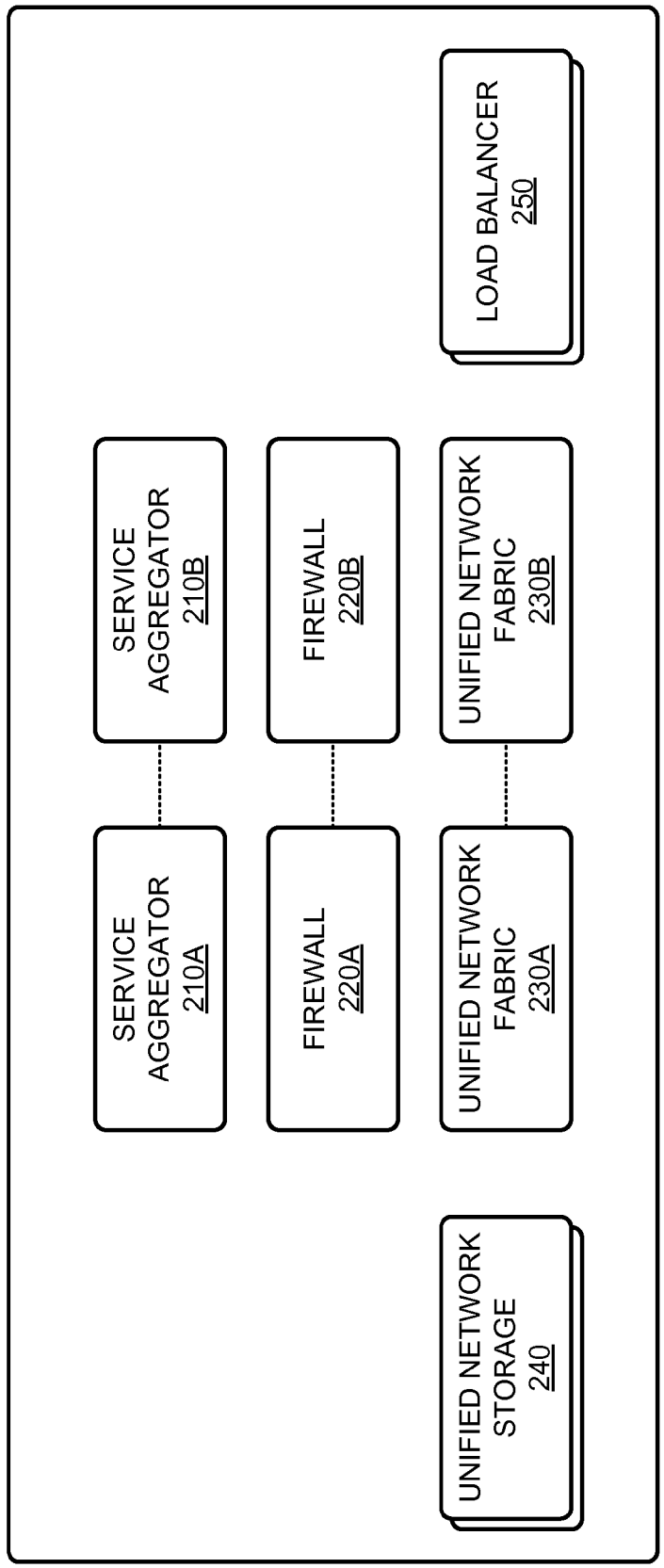
FIG. 2 is a diagram that illustrates components of a cloud computing infrastructure of FIG. 1.

FIG. 2 provides a diagram of a cloud computing infrastructure 140. As shown in FIG. 2, cloud computing infrastructure 140 may include service aggregators 210A and 210B, firewalls 220A and 220B, unified network fabric 230A and 230B, unified network storage 240, and load balancer 250. In one implementation, as shown in FIG. 2, certain components, such as service aggregators 210A and 210B, firewalls 220A and 220B, and unified network fabric 230A and 230B may be set up in a redundant pair configuration with alternating primary/standby roles. The redundant components (e.g., with geographic diversity) may enable seamless failover if a particular device or connection within cloud computing infrastructure 140 fails.

Service aggregators 210A and 210B may each include one or more devices which may be configured to provide consolidated network access to cloud computing infrastructure 140. In one implementation, service aggregators 210A and 210B may include access to numerous services, including services provided by virtualized secure gateway 150.

Firewalls 220A and 220B may each include one or more network devices that may be configured to provide security services for cloud computing infrastructure 140. For example, firewalls 220A and 220B may permit, deny, and/or proxy data connections and be configured to prevent unwanted and/or potentially malicious traffic from infiltrating cloud computing infrastructure 140. Firewalls 220A and 220B may be hardware and/or software based. Firewalls 220A and 220B may provide a controlled interface between zones of differing trust levels through, for example, the enforcement of a security policy.

Unified network fabric 230A and 230B may include multiple network devices, such as switches, routers, servers, bridges, hubs, etc., to provide switching, routing, or other services for cloud computing infrastructure 140. In one implementation the multiple network devices in unified network fabric 230A and/or 230B may collectively emulate the behavior of a single, logical device.

Unified network storage 240 may include one or more devices to store data in cloud computing infrastructure 140. In one implementation, unified network storage 240 may include multiple types of content (e.g., music files, photos, videos, documents, etc.) and applications for distribution, backup, and/or sharing. Data stored in unified network storage 240 may be accessed from different access points and/or devices connected to cloud computing infrastructure 140.

Load balancer 250 may include one or more network devices, or other types of computation or communication devices, to receive requests for services (e.g., from 105, 110) and load balance the requests over devices in cloud computing infrastructure 140. For example, load balancer 250 may forward a received services request to one of multiple redundant components within cloud computing infrastructure 140 based on available resources (e.g., processing time), geography, cost metrics, etc.

Although FIG. 2 shows exemplary components of cloud computing infrastructure 140, in other implementations, cloud computing infrastructure 140 may include fewer components, different components, differently-arranged components, or additional components than depicted in FIG. 2. Additionally, or alternatively, one or more components of cloud computing infrastructure 140 may perform one or more other tasks described as being performed by one or more other components of cloud computing infrastructure 140.

Figure 3:
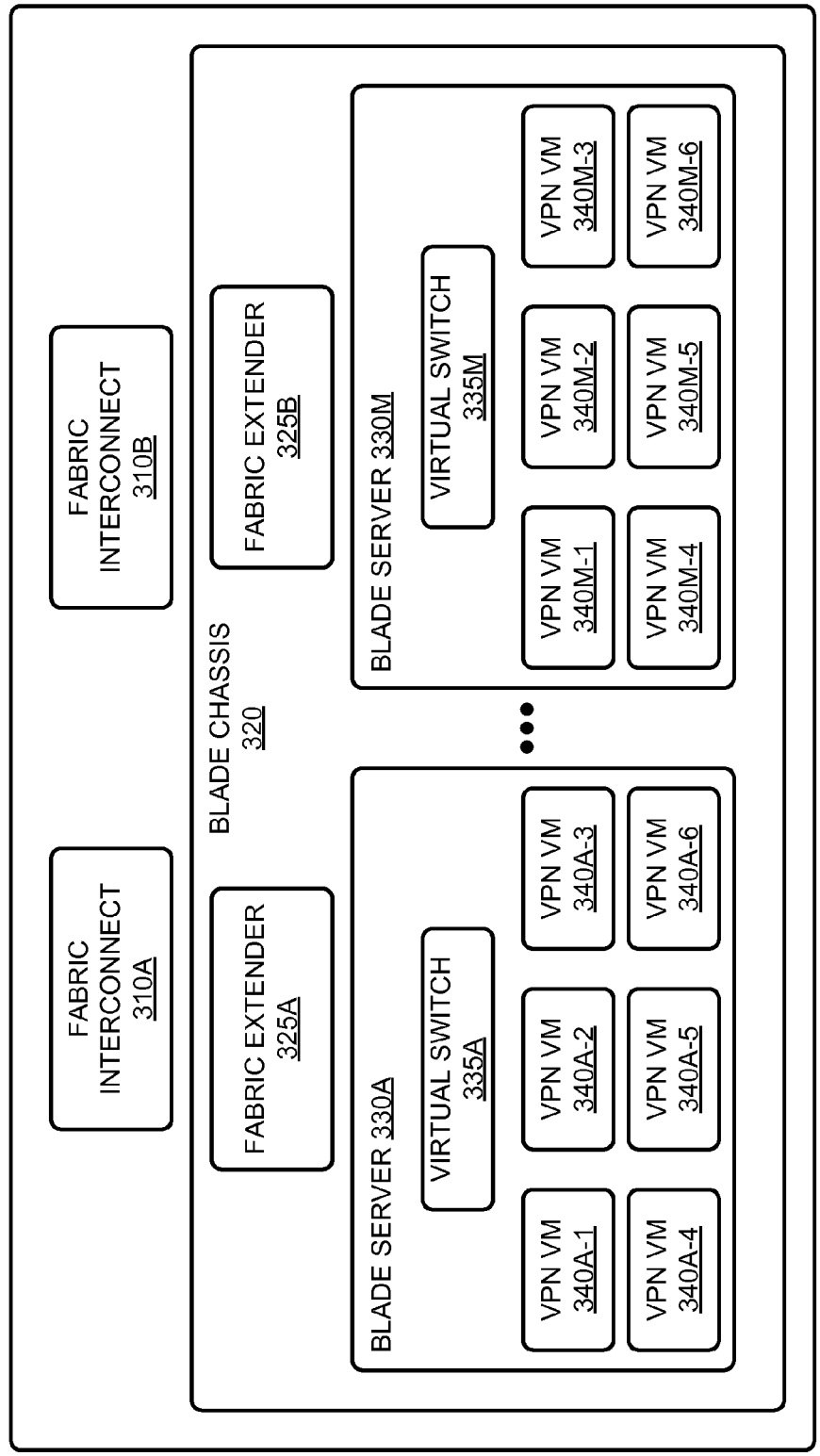
FIG. 3 is a block diagram that illustrates components of a secure gateway of FIG. 1.

FIG. 3 is a block diagram that illustrates components of a virtualized secure gateway 150. As shown in FIG. 3, virtualized secure gateway 150 may include a fabric interconnect pair 310A and 310B (referred to herein generically as "fabric interconnect 310" or collectively as "fabric interconnects 310"), and a blade chassis 320. Blade chassis 320 may include a fabric extender pair 325A and 325B (referred to herein generically as "fabric extender 325" or collectively as "fabric extenders 325") and multiple blade servers 330A through 330M (referred to herein generically as "blade server 330" or collectively as "blade servers 330"). Blade server 330A may include a virtual switch 335A and multiple VPN virtual machine (VM) instances 340A-1 through 340A-N. Additional blade servers 330 (e.g., 330B, 330C, . . . 330M) may be similarly configured.

Fabric interconnect pair 310A and 310B may include network devices configured to provide access to unified network fabric 230 of cloud computing infrastructure 140. As shown in FIG. 3, fabric interconnect 310A and 310B may be deployed as a redundant pair. Fabric interconnect pair 310A and 310B may support multiple blade chassis 320. In one exemplary implementation, fabric interconnect pair 310A and 310B may include CISCO Unified Computing System (UCS) model 6120 20-port fabric interconnects to support up to twenty blade chassis 320. In another exemplary implementation, fabric interconnect pair 310A and 310B may include CISCO UCS model 6140 40-port fabric interconnects to support up to forty blade chassis 320.

Blade chassis 320 may include an enclosure to hold fabric extender pair 325A and 325B and multiple blade servers 330. Blade chassis 320 may generally perform non-core computing services, such as powering, cooling, and connectivity that may be shared among blade servers 330. Each fabric extender 325A and 325B may correspond to a respective fabric interconnect 310A and 310B. Each fabric extender 325 may support multiple connections to its respective fabric interconnect 310. In an exemplary implementation, blade chassis 320 may include a CISCO UCS model 5108 blade chassis that can support up to eight blade servers 330 with each fabric extender 325 providing up to four 10-Gbps (gigabits per second) connections to a respective fabric interconnect 310.

Blade server 330 may include an instance of virtual switch 335. Virtual switch 335 may include a virtual machine access switch to support blade server 330. One virtual switch 335 may support multiple blade servers 330. In an exemplary implementation, virtual switch 335 may include a CISCO Nexus 1000V series switch that supports up to 64 blade servers 330.

Blade servers 330 may employ virtual machine processing (e.g., VPN virtual machine 340) to provide IPsec VPN server functionality or SSL VPN server functionality. In one implementation, each blade server 330 may include two six-core processors and up to 192 GB (gigabytes) of memory. Additionally, or alternatively, blade server 330 may support storage area network (SAN) storage.

Each instance of VPN virtual machine 340 may be dedicated to a particular customer (e.g., including VPN client device 105 and/or devices from customer network 110). Each instance of VPN virtual machine 340 may run on two dedicated cores of blade servers 330. One of the two cores may provide data plane processing and the other of the two cores may provide control plane processing. Of course, the number of instances of VPN virtual machine 340 per blade server may vary depending on the capacity of a particular type of blade server 330. In an exemplary implementation, VPN virtual machine 340 may be implemented using CISCO IOS-XE software. Each instance of VPN virtual machine 340 may support a particular number of tunnels for a single customer based on, for example, processing capacity and other processing requirements. In one implementation each instance of VPN virtual machine 340 may support 150 IPsec VPN tunnels for a single customer. Customers requiring more than 150 tunnels may be assigned additional instances of VPN virtual machine 340. In an implementation where each blade server 330 includes twelve cores (e.g., two six-core processors), six instances of VPN virtual machine 340 may be supported per blade server 330. If blade chassis 320 includes 8 blade servers 330 configured in this manner, blade chassis 320 may support up to 7200 IPsec VPN tunnels.

Although FIG. 3 shows exemplary components of virtualized secure gateway 150, in other implementations, virtualized secure gateway 150 may include fewer components, different components, differently-arranged components, or additional components than depicted in FIG. 3. For example, virtualized secure gateway 150 may include additional chassis 320 and/or blade servers 330 within each chassis 320. Additionally, or alternatively, one or more components of virtualized secure gateway 150 may perform one or more other tasks described as being performed by one or more other components of virtualized secure gateway 150.

FIG. 4 is a diagram of exemplary components of a device 400. Device 400 may correspond to one or more components of network 100, including VPN client device 105, gateway router 115, gateway router 125, provider edge router 135, service aggregator 210, firewall 220, load balancer 250, or blade server 330. Each of these components of network 100 may include one or more devices 400. As shown in FIG. 4, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for execution by processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, or the like. Output device 450 may include a device that outputs information to the operator, such as a display, a speaker, etc.

Communication interface 460 may include a transceiver (e.g., a transmitter and/or receiver) that enables device 400 to communicate with other devices and/or systems. For example, communication interface 460 may include mechanisms for communicating with other devices, such as other devices of network 100 or another device 400.

As described herein, device 400 may perform certain operations in response to processing unit 420 executing software instructions contained in a computer-readable medium, such as memory 430. A computer-readable medium may include a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than depicted in FIG. 4. As an example, in some implementations, input device 440 and/or output device 450 may not be implemented by device 400. In these situations, device 400 may be a "headless" device that does not explicitly include an input or an output device. Alternatively, or additionally, one or more components of device 400 may perform one or more other tasks described as being performed by one or more other components of device 400.

Figure 5A:
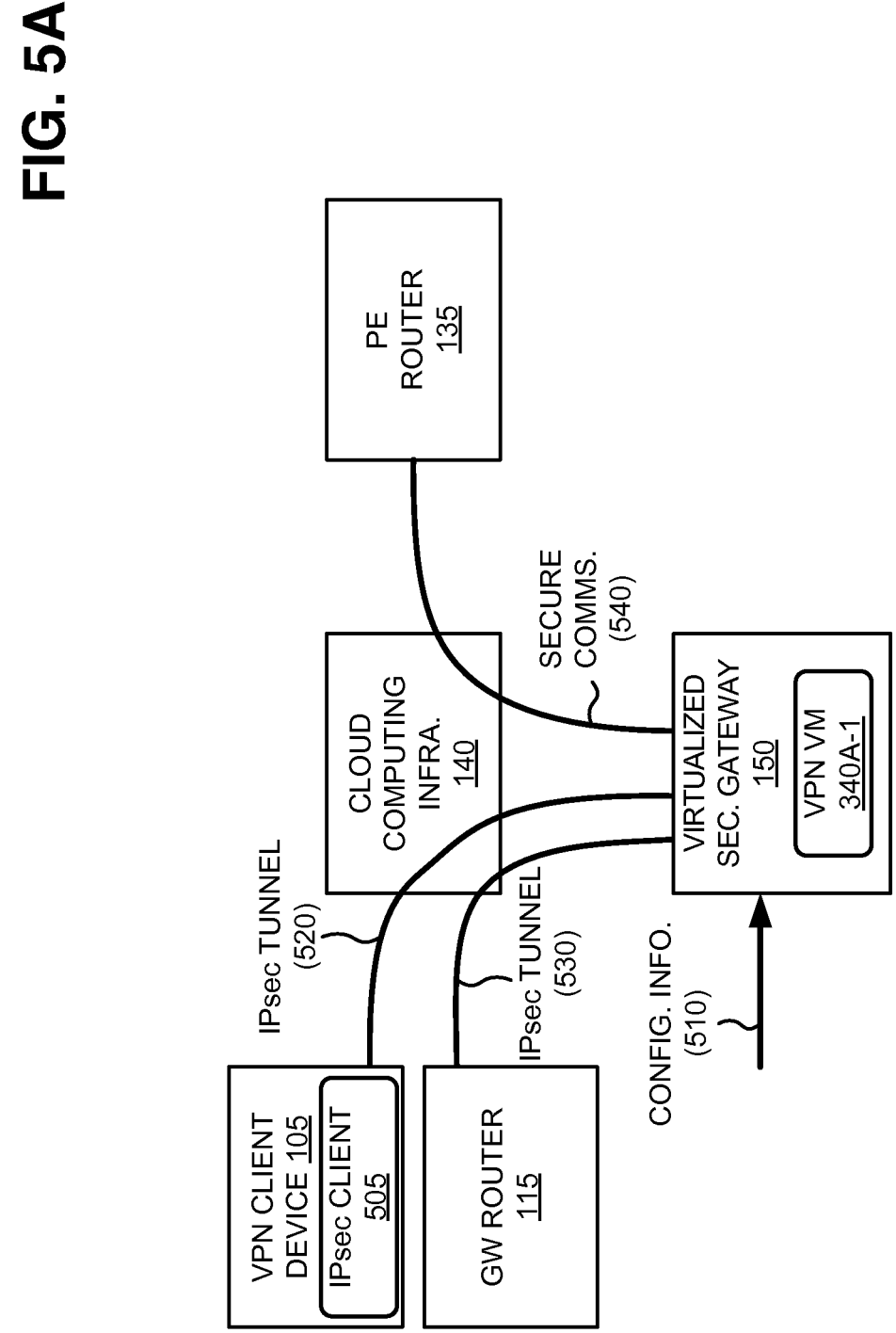
FIGS. 5A and 5B are diagrams of exemplary communications for a portion of the network of FIG. 1.

FIG. 5A is a diagram of exemplary communications for a portion 500 of network 100. As shown in FIG. 5A, network portion 500 may include VPN client device 105, gateway router 115, provider edge routers 135, cloud computing infrastructure 140, and virtualized secure gateway 150. Communications shown in network portion 500 relate to tunneling using IPsec protocols. Other communications within network portion 500 are not included for simplicity. VPN client device 105, gateway router 115, provider edge routers 135, cloud computing infrastructure 140, and virtualized secure gateway 150 may include features described above in connection with, for example, FIGS. 1-4.

As shown in FIG. 5A, VPN client device 105 may include IPsec VPN client 505. More particularly, IPsec VPN client 505 may include a software client for making remote access VPN connections across public networks, such as public IP network 120, using IPsec tunneling protocols. Virtualized secure gateway 150 may receive configuration information 510. Configuration information 510 may be provided, for example, by a network administrator and/or a customer via a configuration interface. Configuration information 510 may include, for example, IPsec policies, filter lists, rules, etc., to terminate multiple VPN tunnels for a single customer accessing private IP network 130 via public IP network 120. For example, as described above in connection with FIG. 3, in one implementation, one instance of VPN virtual machine 340 may support up to 150 IPsec VPN tunnels for a single customer.

IPsec tunnel 520 may include an IPsec tunnel between IPsec client 505 and virtualized secure gateway 150. IPsec tunnel 520 may be initiated by IPsec client 505 to form a security association between IPsec client 505 and an instance of an IPsec VPN server (e.g., VPN VM 340A-1). IPsec tunnel 520 may be used for tunneling situations involving client remote access.

IPsec tunnel 530 may include an IPsec tunnel between gateway router 115 and virtualized secure gateway 150. IPsec tunnel 530 may be initiated, for example, by gateway router 115 (e.g., in response to communications initiated by user devices within customer network 110) to form a security association between IPsec client 505 and the same instance of the IPsec VPN server (e.g., VPN VM 340A-1) used for IPsec tunnel 520. IPsec tunnel 530 may be used in tunneling situations where both tunnel endpoints (e.g., gateway router 115 and virtualized secure gateway 150) have static IP addresses.

Virtualized secure gateway 150 (e.g., VPN VM 340A-1) may forward communications received via IPsec tunnel 520 and/or IPsec tunnel 530 to private IP network (e.g., PE router 135) via secure communications channel 540. Secure communications channel 540 may include, for example, an internal data network, LAN, tunnel, or another secure network connection.

Figure 5B:
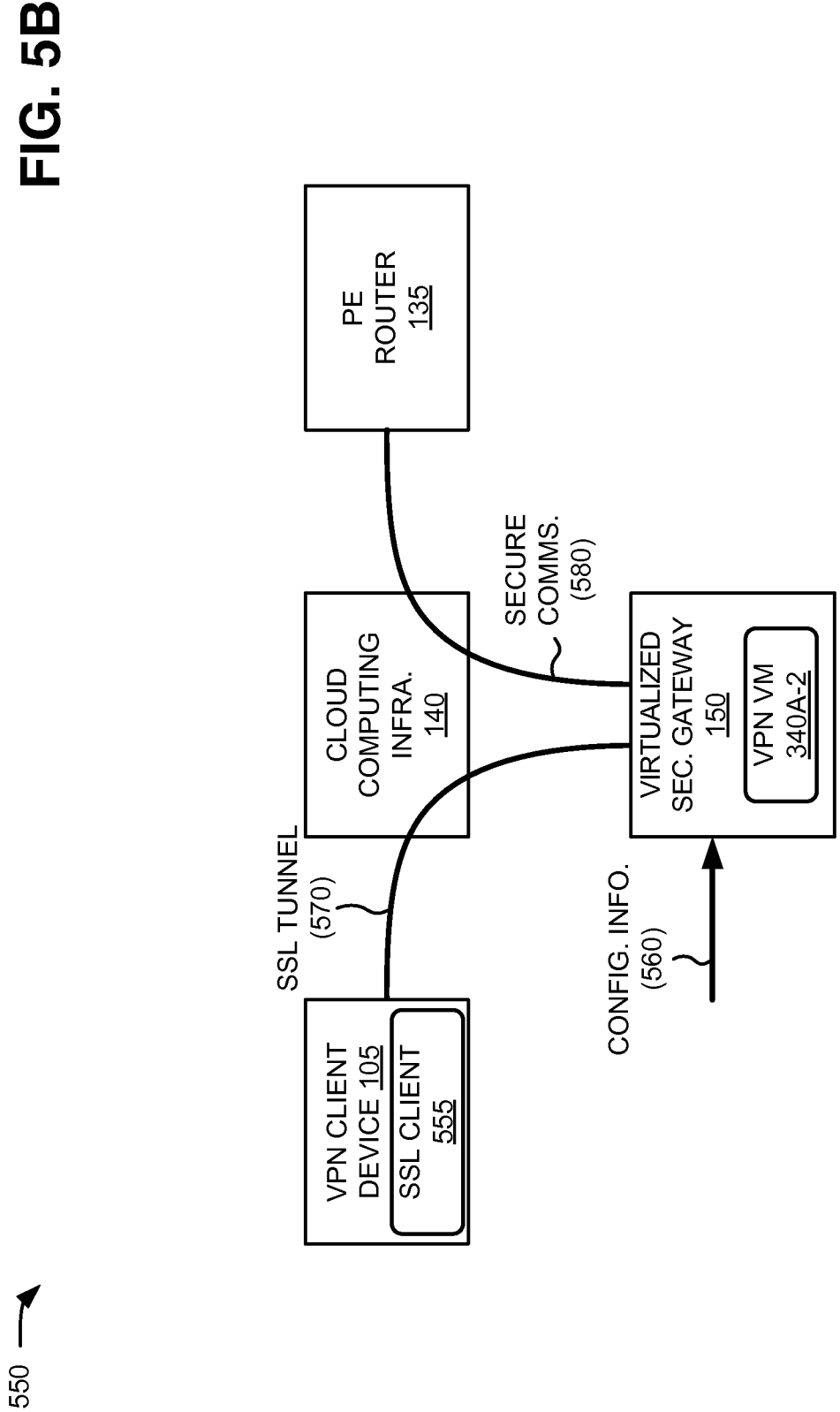

FIG. 5B is a diagram of exemplary communications for a portion 550 of network 100. As shown in FIG. 5B, network portion 550 may include VPN client device 105, provider edge routers 135, cloud computing infrastructure 140, and virtualized secure gateway 150. Communications shown in network portion 500 relate to tunneling sessions using SSL protocols. Other communications within network portion 500 are not included for simplicity. VPN client device 105, provider edge routers 135, cloud computing infrastructure 140, and virtualized secure gateway 150 may include features described above in connection with, for example, FIGS. 1-5A.

As shown in FIG. 5B, VPN client device 105 may include SSL VPN client 555. More particularly, SSL VPN client 555 may include a software client for making remote access VPN connections across public networks, such as public IP network 120, using SSL tunneling protocols. Virtualized secure gateway 150 may receive configuration information 560. Configuration information 560 may include, for example, SSL policies, certificates, rules, etc., to terminate multiple VPN tunnels for a single customer accessing private IP network 130 via public IP network 120. For example, as described above in connection with FIG. 3, in one implementation, one instance of VPN virtual machine 340 may support up to 150 SSL VPN tunnels for a single customer.

SSL tunnel 570 may include an SSL tunnel between SSL client 555 and virtualized secure gateway 150. SSL tunnel 570 may be initiated by SSL client 555 to form a security association between SSL client 555 and an instance of an IPsec VPN server (e.g., VPN VM 340A-2). SSL tunnel 570 may be used for tunneling situations involving either client remote access or access from devices within customer network 110 (not shown).

Virtualized secure gateway 150 (e.g., VPN VM 340A-2) may forward communications received via SSL tunnel 570 to private IP network (e.g., provider edge router 135) via secure communications channel 580. Secure communications channel 580 may be the same or a different network path than communications channel 540 of FIG. 5A.

Although FIGS. 5A and 5B show exemplary communications among components of network portions 500/550, in other implementations, network portions 500/550 may include fewer components, different components, differently-arranged components, or additional components than depicted in FIGS. 5A and 5B. Additionally, or alternatively, one or more components of network portions 500/550 may perform one or more other tasks described as being performed by one or more other components of network portions 500/550.

FIG. 6 is a flowchart of an exemplary process 600 for providing a virtualized secure gateway, according to an implementation described herein. In one implementation, process 600 may be performed by one or more components of cloud computing infrastructure 140, such as device 400. In another implementation, one or more blocks of process 600 may be performed by one or more other devices or a group of devices excluding cloud computing infrastructure 140.

Process 600 may include receiving configuration information for customers of a private IP network (block 1310). For example, as described in connection with FIG. 5A, virtualized secure gateway 150 may receive configuration information 510. Configuration information 510 may be provided, for example, by a network administrator and/or a customer via a configuration interface. Configuration information 510 may include, for example, IPsec policies, filter lists, rules, etc., to terminate multiple VPN tunnels for a single customer accessing private IP network 130 via public IP network 120. In one implementation, virtualized secure gateway 150 may receive multiple sets of configuration information 510 (e.g., for different customers).

Process 600 may also include configuring processing resources for multiple instances of a virtualized secure gateway, such that each instance of the multiple instances provides a point of entry to the private IP network and each instance of the multiple instances resides on a different processing core of the cloud-computing infrastructure (block 1320). For example, as described in connection with FIG. 3, each instance of VPN virtual machine 340 in virtualized secure gateway 150 may be dedicated to a particular customer (e.g., including VPN client device 105 and/or devices from customer network 110). Each instance of VPN virtual machine 340 may run on two dedicated cores of blade servers 330.

Process 600 may further include terminating VPN tunnels from the public IP network for different customers using the different instances of the virtualized secure gateway (block 1330). For example, as described above in connection with FIG. 5A, IPsec tunnel 520 may include an IPsec tunnel between IPsec client 505 and virtualized secure gateway 150. IPsec tunnel 520 may be initiated by IPsec client 505 to form a security association between IPsec client 505 and an instance of an IPsec VPN server (e.g., VPN VM 340A-1). Similarly, IPsec tunnel 530 may include an IPsec tunnel between gateway router 115 and virtualized secure gateway 150. IPsec tunnel 530 may be initiated, for example, by gateway router 115 (e.g., in response to activities within customer network 110) to form a security association between IPsec client 505 and the same instance of the IPsec VPN server (e.g., VPN VM 340A-1) used for IPsec tunnel 520. A different customer (not shown) may initiate IPsec tunnels with a different instance of an IPsec VPN server (e.g., VPN VM 340A-5).

Systems and/or methods described herein may receive, from a network device, configuration information for multiple customers of a private Internet Protocol (IP) network and may configure, in a cloud-computing infrastructure that provides multitenant access from a public IP network, processing resources for multiple instances of a virtualized secure gateway. Each instance may correspond to a particular customer of the multiple customers and each instance may reside on a different processing core of the cloud-computing infrastructure. The systems and/or methods may dynamically add or remove virtualized secure gateway resources based on service needs, such as the number of different customers and/or the number of tunnels required by each customer. The systems and/or methods described herein may interoperate with current secure gateway architecture and may be transparent to end users (e.g., customers).

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While a series of blocks has been described with regard to the process illustrated in FIG. 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A system, comprising:
   cloud-computing infrastructure to provide multitenant access from a public Internet Protocol (IP) network, the cloud-computing infrastructure including one or more physical devices with multiple processing cores; and
   multiple instances of a virtual machine for providing secure gateway functionality without unique dedicated infrastructure build-outs, the multiple instances operating on the one or more physical devices, wherein each instance of the multiple instances of the virtual machine is dedicated to terminate multiple virtual private network (VPN) tunnels for a single customer, including a first VPN tunnel initiated by a client device having a dynamic IP address and a second VPN tunnel initiated by a gateway device in a customer network and having a static IP address,
   wherein each instance of the multiple instances of the virtual machine is executed on a different pair of processing cores of the one or more physical devices within the cloud-computing infrastructure, such that a first processing core of each pair of processing cores provides data plane processing for the single customer and a second processing core of each pair of processing cores provides control plane processing for the single customer, and
   wherein, for each pair of processing cores, an instance of the multiple instances of the virtual machine terminates VPN tunnels for hardware clients on one of the pair of processing cores and terminates VPN tunnels for software VPN clients on another one of the pair of processing cores.

2. The system of claim 1, wherein the pairs of processing cores are included within one or more blades of a blade server.

3. The system of claim 2, wherein the one or more blades of the blade server are further configured to provide one or more other security services for a private IP network, along with terminating the multiple VPN tunnels.

4. The system of claim 3, wherein the one or more other security services includes:
   intrusion detection and prevention systems (IDPS) service, email filtering,
   Web filtering, or
   distributed denial of service (DDoS) attack protection.

5. The system of claim 1, wherein one or more of the pairs of processing cores provide Internet Protocol Secure (IPsec) VPN server functionality.

6. The system of claim 1, wherein one or more of the pairs of processing cores provide Secure Socket Layer (SSL) VPN server functionality.

7. The system of claim 1, wherein a number of the multiple instances of the virtual machine is dynamically scalable.

8. The system of claim 1, wherein each instance of the multiple instances of the virtual machine supports at least 150 VPN tunnels for a particular customer.

9. A method, comprising:
   receiving, from a first network device, configuration information for customers of a private Internet Protocol (IP) network;
   reserving, in a cloud-computing infrastructure that provides multitenant access from a public IP network, processing resources for multiple instances of a virtual machine for providing secure gateway functionality without unique dedicated infrastructure build-outs, wherein each instance of the multiple instances is dedicated to terminate multiple virtual private network (VPN) tunnels for a single customer, including a first VPN tunnel initiated by a client device having a dynamic IP address and a second VPN tunnel initiated by a gateway device in a customer network and having a static IP address,
   wherein each instance of the multiple instances is executed on a different processing core pair of multiple processing cores in the cloud-computing infrastructure, such that a first processing core of each processing core pair provides data plane processing for the single customer and a second processing core of each processing core pair provides control plane processing for the single customer, and wherein, for each pair of processing cores, an instance of the multiple instances of the virtual machine terminates VPN tunnels for hardware clients on one of the pair of processing cores and terminates VPN tunnels for software VPN clients on another one of the pair of processing cores;

establishing, using a first instance of the multiple instances of the virtual machine on a first processing core pair, a virtualized secure gateway for a first set of virtual private network (VPN) tunnels originating from one or more devices of a first customer using the public IP network; and establishing, using a second instance of the multiple instances of the virtual machine on a second processing core pair, a virtualized secure gateway for a second set of VPN tunnels originating from one or more devices of a second customer using the public IP network.

10. The method of claim 9, wherein each processing core pair of the multiple processing cores in the cloud-computing infrastructure is distributed among one or more blade servers.

11. The method of claim 9, wherein the one or more devices of the first customer includes a hardware VPN client.

12. The method of claim 9, wherein the one or more devices of the first customer includes a software VPN client.

13. The method of claim 9, wherein, when establishing the virtualized secure gateway for the first set of VPN tunnels, the first instance of the multiple instances of the virtual machine applies Internet Protocol Secure (IPsec) protocols.

14. The method of claim 9, wherein, when establishing the virtualized secure gateway for the first set of VPN tunnels, the first instance of the multiple instances of the virtual machine applies Secure Socket Layer (SSL) protocols.

15. One or more devices, comprising:
a memory to store a plurality of instructions; and
one or more processors to execute instructions in the memory to:
receive, from a network device, configuration information for multiple customers of a private Internet Protocol (IP) network; and
reserve, in a cloud-computing infrastructure that provides multitenant access from a public IP network, processing resources for multiple instances of a virtual machine for providing secure gateway functionality without unique dedicated infrastructure build-outs, wherein each instance of the multiple instances is dedicated to terminate multiple virtual private network (VPN) tunnels for a customer, of the multiple customers, including a first VPN tunnel initiated by a client device having a dynamic IP address and a second VPN tunnel initiated by a gateway device in a customer network and having a static IP address, wherein each instance of the multiple instances resides on a different processing core pair of the cloud-computing infrastructure, such that a first processing core of each instance provides data plane processing for the customer and a second processing core of each instance provides control plane processing for the customer, and wherein, for each pair of processing cores, an instance of the multiple instances of the virtual machine terminates VPN tunnels for hardware clients on one of the pair of processing cores and terminates VPN tunnels for software VPN clients on another one of the pair of processing cores.

16. The one or more devices of claim 15, wherein the one or more processors are further configured to:
establish a first instance of the multiple instances of the virtual machine as a virtualized secure gateway for terminating a first set of virtual private network (VPN) tunnels from one or more devices of the customer, of the multiple customers, using the public IP network; and
establish a second instance of the multiple instances of the virtual machine as a virtualized secure gateway for terminating a second set of VPN tunnels from one or more devices of another customer, of the multiple customers, using the public IP network.

17. The one or more devices of claim 15, wherein each instance of the multiple instances of the virtual machine supports at least 150 VPN tunnels for one of the multiple customers.

18. The one or more devices of claim 15, wherein the secure gateway functionality includes Secure Socket Layer (SSL) VPN server functionality and Internet Protocol Secure (IPsec) VPN server functionality.

* * * * *